(12) United States Patent
Varghese et al.

(10) Patent No.: US 12,031,574 B2
(45) Date of Patent: Jul. 9, 2024

(54) BEARING ASSEMBLY

(71) Applicant: DIAMOND INNOVATIONS, INC., Worthington, OH (US)

(72) Inventors: Biju Varghese, Westerville, OH (US); Venkata Durga Prasad Kappagantula, Lewis Center, OH (US); Anshul Singh, Columbus, OH (US); Andrew Gledhill, Westerville, OH (US); Joseph M. Rhodes, Pataskala, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 214 days.

(21) Appl. No.: 17/641,133

(22) PCT Filed: Oct. 16, 2020

(86) PCT No.: PCT/US2020/056028
§ 371 (c)(1),
(2) Date: Mar. 8, 2022

(87) PCT Pub. No.: WO2021/076923
PCT Pub. Date: Apr. 22, 2021

(65) Prior Publication Data
US 2022/0373020 A1 Nov. 24, 2022

Related U.S. Application Data

(60) Provisional application No. 63/092,304, filed on Oct. 15, 2020, provisional application No. 62/915,922, filed on Oct. 16, 2019.

(51) Int. Cl.
*F16C 17/04* (2006.01)
*F16C 33/04* (2006.01)
(Continued)

(52) U.S. Cl.
CPC ............ *F16C 17/04* (2013.01); *F16C 33/043* (2013.01); *F16C 33/26* (2013.01); *F16C 43/02* (2013.01);
(Continued)

(58) Field of Classification Search
CPC ........ F16C 17/04; F16C 33/043; F16C 33/26; F16C 33/108; F16C 43/02; F16C 2206/04;
(Continued)

(56) References Cited

U.S. PATENT DOCUMENTS 9,297,411 B2 * 3/2016 Peterson ................. E21B 17/03
9,353,789 B1 * 5/2016 Gonzalez ................ F16C 17/02
(Continued)

OTHER PUBLICATIONS

J-B WELD 37901 Epoxy Adhesive, Gray, 3.00 oz. Size, Grainger, (Jan. 31, 2017), URL: https://www.ebay.com/itm/J-B-WELD-Epoxy-Adhesive-Gray-3-00oz-Size-37901/312507968539#wid, XP055817005 [Y]7*, entire document especially product image.
(Continued)

*Primary Examiner* — Alan B Waits
(74) *Attorney, Agent, or Firm* — Ari G. Zytcer; Eren Sumer (57) ABSTRACT

Provided are bearing assemblies including one or more substrate assemblies, such as thrust bearing assemblies. The substrate assemblies include a bearing element fixed to a substrate. The bearing elements are formed from a thermally stable material such as a ceramic-bonded diamond composite. Methods for manufacturing the bearing assemblies are also provided.

13 Claims, 9 Drawing Sheets

(51) Int. Cl.
*F16C 33/26* (2006.01)
*F16C 43/02* (2006.01)

(52) U.S. Cl.
CPC ...... *F16C 2206/04* (2013.01); *F16C 2226/40* (2013.01); *F16C 2352/00* (2013.01)

(58) Field of Classification Search
CPC .. F16C 2226/40; F16C 2352/00; E21B 4/003; Y10T 29/49636–4971
See application file for complete search history.

(56) References Cited

U.S. PATENT DOCUMENTS

| | | | |
|---|---|---|---|
| 2008/0206576 A1 | 8/2008 | Qian et al. | |
| 2011/0283629 A1 | 11/2011 | Easley | |
| 2013/0156357 A1* | 6/2013 | Peterson | F16C 33/043 384/129 |
| 2015/0233423 A1* | 8/2015 | Peterson | F16C 43/02 384/420 |
| 2018/0216661 A1 | 8/2018 | Gonzalez | |
| 2023/0265884 A1* | 8/2023 | Gonzalez | F16C 33/26 384/91 |

OTHER PUBLICATIONS

Fine Ceramics (Advanced Ceramics), Kyocera, (Jul. 4, 2016), URL: https://web.archive.org/web/20160704045154/https://global.kyocera.com/prdct/fc/list/material/silicon_carbide/silicon_carbide.html. XP055817007 [A] 1*, entire document.

* cited by examiner

BEARING ASSEMBLY

This is a National Phase Application filed under 35 U.S.C. 371 as the national stage of PCT/US2020/056028, filed on Oct. 16, 2020, an application claiming the benefit of U.S. Provisional Application No. 63/092,304, filed on Oct. 15, 2020, and U.S. Provisional Application No. 62/915,922, filed on Oct. 16, 2019, the entire contents of each of which are hereby incorporated by reference in its entirety.

FIELD OF THE DISCLOSURE

The present disclosure relates to bearing assemblies, in particular thrust bearing assemblies including at least one substrate and at least one bearing element fixed thereto. More specifically, the present disclosure relates to thrust bearing assemblies including a bearing element of a diamond composite material that is operable at high temperatures and has exceptional wear resistance as well as improved mechanical performance. The disclosure further relates to methods of manufacturing the thrust bearing assemblies.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present subject matter.

Bearings are used in a multitude of applications to facilitate relative motion between two surfaces to reduce energy loss associated with forces, including, e.g., friction while supporting load stresses. For example, in downhole drilling, holes in the earth may be drilled by rotating a drill pipe at the ground surface with a rock bit on the lower end of the pipe for drilling the earth. In such rotary drilling, the entire drill string rotates. However, for deep drilling or drilling through difficult materials, a hydraulic motor may be placed down a bore hole with a rock bit connected to the motor. Drilling fluid, commonly referred to as mud, is pumped down a pipe connected to the motor. The drilling fluid drives the motor which rotates the rock bit. The mud returns to the ground surface through the annulus surrounding the pipe in the bore hole. In such an arrangement it is not necessary to rotate the entire drill string. However, substantial thrust loads are created in this type of drilling.

Accordingly, between the motor and the bit for drilling there is a bearing assembly. Such an assembly has a fixed casing which is threaded to the casing for the motor and a shaft which is connected to the motor shaft. The bearing assembly may include, e.g., radial journal bearings between the shaft and housing and thrust bearings for carrying the substantial thrust loads involved in this mode of drilling.

High pressure drilling fluid is applied through the pipe to the motor while the bit is off of the bottom of the hole. This generates a high thrust load tending to push the shaft downhole. This is referred to as an off bottom load. After the bit is rotating, the assembly is lowered so that the bit is in engagement with the bottom of the hole with sufficient pressure to effect drilling. This reverses the direction of thrust in the bearing assembly and is referred to as the on-bottom thrust. Several such thrust reversals can be encountered as drilling is stopped and started each time a length of drill pipe is added to the string or for other reasons.

The thrust bearings are subjected to high loads, vibration, and in some cases rather high rotational speeds. Speeds in a positive displacement motor can be in the range of 125 to 500 RPM, or greater. Turbo drill speeds can be four times larger and are typically 1000 RPM, or greater. Thus, the bearing assembly must last hundreds of hours so as to outlast the rock bit.

The off-bottom load to be carried by the thrust bearings can be as much as 30,000 pounds when a positive displacement motor is used. Off-bottom thrust can be as much as 40,000 pounds with rotational speeds as high as 2000 RPM with a turbine motor, although such conditions are preferably avoided. The on-bottom thrust loads at low to intermediate speeds (e. g., 125 to 400 RPM) range from 10,000 to 40,000 pounds. At high speeds (e.g., 1000 RPM) thrust loads can range up to 20,000 pounds or more.

Thrust bearings using balls operating in thrust carrying races have been used for the thrust bearings between a downhole drill motor and a rock bit. A substantial problem with ball bearing type thrust bearings is the ability to sustain high drilling loads for long enough periods of time. The ball bearing thrust bearings presently available are not suitable for carrying thrust of more than 9072 kg on a sustained basis, particularly at high speeds. When the assembly must carry very high thrust loads in either of two directions, a rather large number of separate ball bearing stages must be used so that no individual stage is excessively loaded. This results in a bearing assembly that is extraordinarily long. The assembly may need to be sealed to retain lubricant for the bearings and seals are difficult in the downhole conditions. Such assemblies are also costly to manufacture, assemble and adjust to the required precision.

A common thrust bearing assembly for a downhole drill is described in U.S. Pat. No. 4,560,014, incorporated herein by reference in its entirety. The thrust bearing described therein includes a bearing surface formed by a plurality of tungsten carbide inserts in a substrate. The cemented tungsten carbide inserts, which include cobalt as a catalyst and have a polycrystalline diamond face, are arranged so the diamond faces collectively form a planar thrust bearing face. However, when operating such a thrust bearing under standard conditions, the polycrystalline diamond faces quickly break down due to high temperatures generated by the speed of the motor. The degradation of the PCD faces is amplified when an abrasive slurry passes near or between the bearing surfaces.

The PCD bearing elements, such as those utilized in U.S. Pat. No. 4,560,014, are commonly used today in demanding applications. However, the use PCD bearing elements can limit the operating conditions in terms of speed and applied load. As the operating velocity or applied pressure is increased, the bearing surface temperatures rise rapidly which in turn degrade the PCD resulting accelerated wear. Therefore, PCD bearing are used at less than optimal operating conditions (lower speeds and lower loads).

Thus, it would be advantageous to have a thrust bearing assembly, or radial bearing assembly, in which the bearing element is formed from a material that is operable at high temperatures and has exceptional wear resistance and improved mechanical performance.

SUMMARY

The present disclosure is directed to bearing assemblies, in particular for thrust or radial bearings, that include a surface formed from a thermally stable diamond material. The thermally stable diamond material may be a diamond material that does not include cobalt, such as a sintered PCD body free from cobalt, or a sintered diamond-ceramic composite material, or other inherently thermally stable PDC cutter material. The thermally stable material allows for operating the bearing assembly at significant higher operating conditions than is possible today. The thermally stable diamond material may be attached to the bearing substrate by utilizing a high temperature epoxy or brazing, which in concert with thermally stable diamond material, protects the integrity of the joint formed between the thermally stable diamond material and substrate material. Additional features and advantages will be set forth in the description that follows, and in part will be apparent from the description, or may be learned by practice of the subject matter. The objectives and other advantages of the disclosure will be realized and attained by the structures, particularly pointed out in the written description and claims thereof, as well as the appended drawings.

Provided is a bearing assembly. The bearing assembly may be a sliding or roller bearing assembly, including, for example, a thrust bearing assembly, a radial bearing assembly, a ball bearing assembly, a roller bearing assembly, a tapered bearing assembly, or the like.

The bearing assembly includes at least one substrate assembly. As used herein, the term "bearing assembly" may refer to one or more substrate assemblies either alone or in communication with another. The at least one substrate assembly may include a substrate and at least one bearing element joined at a surface thereof. When attached to a substrate, the bearing elements have an exposed outwardly facing bearing element face which is configured to be in sliding communication with a face of one or more opposing bearing elements joined to an opposing substrate assembly. The opposing substrate assembly may have the same or substantially same structure as the first provided at least one substrate assembly.

In such an arrangement, the first substrate assembly may include a first substrate with one or more bearing element attached to a surface thereof. A second substrate assembly with an identical, or substantially similar structure may also be provided. When assembled, the first substrate assembly is placed in sliding communication with the second substrate at the faces of the bearing elements.

In some instances, the bearing assembly may include more than two substrate assemblies. For example, a bearing assembly may be provided with three substrate assemblies. The bearing assembly may comprise or consist of an upper substrate assembly, a lower substrate assembly, and at least one intermediate substrate therebetween. The upper and lower substrate assemblies may each include at least one bearing element joined to a surface thereof while the intermediate substrate assembly may include at least one bearing element joined to each of opposing surfaces of the intermediate substrate. When assembled, the bearing elements are in sliding communication with one another at the respective faces of the substrate assemblies.

The bearing elements may comprise or consist of a thermally stable material. For example, the thermally stable material may be a ceramic-bonded diamond composite material, a leached PCD material, a PCD material free of, or substantially free of, cobalt, or other thermally stable material.

One ceramic-bonded diamond composite material that may be used is VERSIMAX® produced by Hyperion Materials and Technologies. VERSIMAX® includes, by weight, about 90% diamond grains, about 9% silicon carbide bonded to the diamond grains and about 1% unreacted silicon metal. VERSIMAX® is thermally stable at temperatures of up to 1400° C. Other thermally stable ceramic-bonded diamond composite materials may also be used for the bearing element material. For example, a thermally stable material may comprise or consist of, by weight, about 50 to about 96% diamond grains, about 3 to about 49% silicon carbide, and about 0.1 to about 10% unreacted silicon metal. The ceramic-bonded diamond material may also comprise or consist of, by weight, about 50-99% diamond grains, 1-25% silicon carbide bonded to the diamond grains and 0.01-5% unreacted silicon metal.

In the case of a leached PCD material, any PCD material that has been subject to a leaching process in order to remove cobalt may be used. The leached cutter may be leached at the cutting surface or on the sides of the cutter. Previously used or recycled PCD cutters may also be used, provided that the cutters are free from, or substantially free from, cobalt at the surface.

The substrate may comprise or consist of one or more substrate material. For example, the substrate may be an Fe based alloy, such as a steel. The substrate may comprise or consist of a carbide material such as a cemented carbide. Cemented carbides are metal-matrix composites comprising carbides of one or more of the transition metals belonging to groups IVB, VB, and VIB of the periodic table (Ti, V, Cr, Zr, Nb, Mo, Hf, Ta, and W) as the hard particles or dispersed phase, and cobalt, nickel, or iron (or alloys of these metals) as the binder or continuous phase. Among the different possible hard particle-binder combinations, cemented carbides based on tungsten carbide (WC) as the hard particle, and cobalt as the binder phase, are often used. However, any cemented carbide may be utilized, including, e.g., those based on titanium carbide (TiC), tantalum carbide (TaC), chromium carbide (CrC) or niobium carbide (NbC).

The substrate as provided herein may also include two or more materials joined together. For example, the substrate may include a first portion formed from a first material, e.g., steel, and a second portion formed of a second material, e.g., a cemented carbide.

The bearing element may be joined to the substrate by any known process or material. For example, the bearing element may brazed to the substrate using one or more brazing materials. For example, the when the bearing element is brazed to the substrate the brazing material may be one or more brazing alloy, including active braze alloys, e.g., TICUSIL®, INCUSIL®, or PALNICRO®, all which are available from Wesgo Metals. However, any suitable brazing material may be utilized.

An epoxy or other adhesive formulation may also be used to join bearing elements to the substrate. As used herein, the term "epoxy" or "epoxy adhesive" means a composition, or combination of compositions, that comprises or forms epoxides or polymers of epoxides.

For example, suitable commercially available epoxy adhesive formulations include, e.g., JB WELD® 453u38, OMEGA® OB-700, among others. An example of another adhesive formulation, specifically a glue, is 620 LOCTITE® 4KM32. The epoxy or other adhesive formulation may be applied at room temperature under atmospheric conditions or subjected to a heating. For example, a substrate with one or more bearing element joined with JB WELD® 453u38 may be placed in a furnace at a temperature of 500° C. for a period of 30 minutes. JB WELD® 453u38 is an epoxy adhesive for suitable for temperatures from 0 to 1315° C. that includes, by weight, 40-50% silicic acid (sodium salt), 40-60% steel fines and an epoxy resin. However, any suitable high temperature epoxy or adhesive composition may be used.

The present disclosure also includes methods of manufacturing a bearing assembly, including a thrust bearing assembly, a radial bearing assembly or the like. The method may include providing one or more substrate assemblies. The substrate assemblies may include a substrate and a bearing element. The substrate may be any material or more than one material, including steel, a cemented carbide or other ceramic materials, and the like. The bearing element can be formed from any known thermally stable material. For example, the thermally stable material may be a ceramic-bonded diamond composite material, a leached PCD material, a PCD material free of, or substantially free of, cobalt, or other thermally stable material. The method may further comprise joining one or more bearing elements to the substrate at one or more surfaces thereof by known techniques including, e.g., brazing, epoxy, other adhesive formulations, a friction fit, a screw fit, or other methods.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWING

The accompanying drawings, which are included to provide a further understanding of the invention and are incorporated in and constitute a part of this specification, illustrate implementations of the invention and together with the description serve to explain the principles of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience. Also, for ease of viewing, in some instances only some of the named features in the figures are labeled with reference numerals.

DETAILED DESCRIPTION

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Figure 1A:
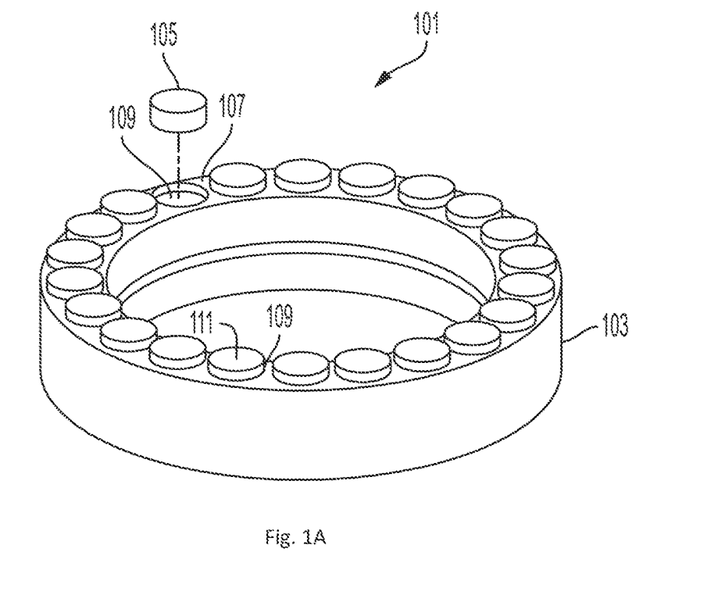
FIG. 1A shows a perspective view of a partially assembled substrate assembly for a thrust bearing assembly according to the present subject matter.

Turning to the drawing figures, FIG. 1A shows a perspective view of a partially assembled substrate assembly 101 for a thrust bearing assembly according to the present subject matter. As shown, the substrate assembly 101 includes a substrate 103. While the substrate 101 is shown as having an annular or substantially annular shape, the substrate 101 may be formed in any shape suitable for a specific use. Also shown are a plurality of bearing elements 105. The bearing elements 105 are joined to the substrate 103 at the substrate surface 107. The substrate assembly shown in FIG. 1A includes bearing elements attached to one surface of the substrate 103. However, one or more bearing elements 105 may also be joined to the opposing surface (not shown) of the substrate 103. As shown, the substrate face 107 includes a plurality of recesses 109 shaped to accommodate the bearing elements 105. Though not shown, the substrate face 107 may not include recesses 109. In this regard, the substrate face may be substantially planar, planar or include formations the extend outward from the substrate face 107. In such assemblies, the bearing elements 105 may be directly to the substrate or via on to which the bearing elements 105. Alternatively, an intermediate structure (not shown) may be used to join the bearing elements 105 to the substrate 103. The intermediate structure may be the same or a different material as the substrate 103 and/or the bearing elements 105. An epoxy, adhesive formulation or braze may be utilized to join the bearing element 105 to the substrate 103 either directly or indirectly by joining the bearing element 105 to a surface of the intermediate structure and joining the opposing surface of the intermediate structure to the substrate surface 107.

As shown in FIG. 1A, the bearing elements 105 are formed or cut into a shape such as a cylinder. The bearing elements 105 may be cut from a larger piece of material, i.e., a blank, via any known method. One method for cutting the bearing elements is electrical discharge machining (EDM) in which a desired shape is obtained by using electrical discharges (sparks). Another possible method of forming the bearing elements 105 is by grinding or machining the bearing elements 105 from a rough or recycled material. Suitable bearing element shapes according to the present subject matter include, e.g., two or three dimensional forms of: a circle, a square, a rectangle, a triangle, a trapezoid, a nonagon, a octagon, a heptagon, a hexagon, a scalene triangle, a right triangle, a parallelogram, a rhombus, a square, a pentagon, a circle, an oval, a star and a crescent, or the like.

The bearing assembly may include a fluid restriction element (not shown) to increase the turbulence of, e.g., drilling fluid flow between the bearing elements 105. The fluid restriction element is designed to increase the Reynold's number of the fluid flowing between the bearing elements 105, thereby increasing the eddy currents and cavitation within the fluid, and as a result, increasing convective heat transfer.

For example, with specific regard to thrust bearing assemblies and radial bearing assemblies used in down hole drilling, drilling fluid acts as both a lubricant to the substrate assembly contact area (i.e., the face 111 of the bearing elements 105), and as a source of heat transfer, pulling heat away from the bearing elements 105. Increased turbulence in this flow will greatly improve the heat transfer from the bearing elements 105 to the drilling fluid (not shown).

In the field of fluid dynamics, the Nusselt number is the ratio of convective heat transfer to conductive heat transfer at the boundary of a system. In the present example, at the boundary between the bearing element 105 and the drilling fluid, a laminar flow results in a mostly conductive heat transfer, and the resulting Nusselt number is in the range of one to ten. When a baffle or other fluid restriction element is utilized in the substrate assembly, increased turbulence in the flow employs much more convective heat transfer, and the resulting Nusselt number is in the range of 100-1000.

While not limiting to the aforementioned representations, the fluid restriction element can be in the form of a baffle on the bearing element 105, a concave depression or a convex protrusion on the substrate surface 107, or the like. The size, placement, and number of fluid restriction element will determine the extent of the turbulence induced.

By way of example, the bearing elements 105 may further include one or more baffle to affect the flow of fluid between the bearing elements. The baffle may be a depression or void formed on the exterior of the bearing element 105, or a protrusion extending outward from a surface of the bearing element. The baffle may be on the side 109 of the bearing element so the outwardly exposed bearing element face 111 is smooth and without obstruction.

Figure 1B:
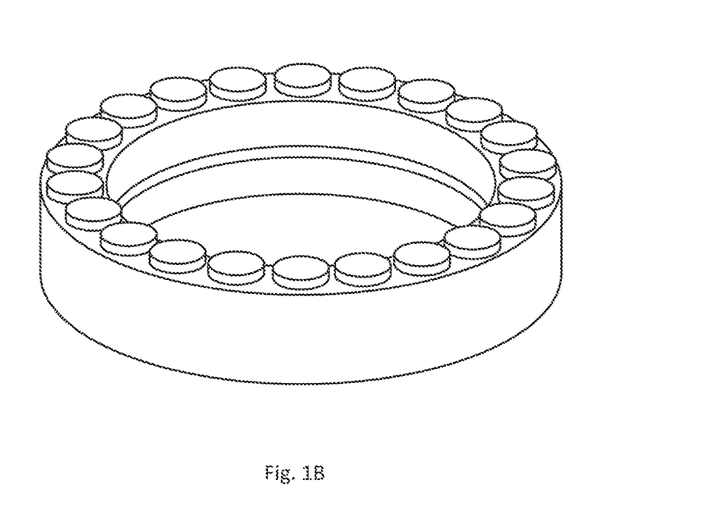
FIG. 1B is a perspective view of the assembled substrate assembly shown in FIG. 1A.

FIG. 1B shows a substrate assembly in which all of the bearing elements 105 have been joined to the substrate 103 at the substrate surface 107.

Figure 2A:
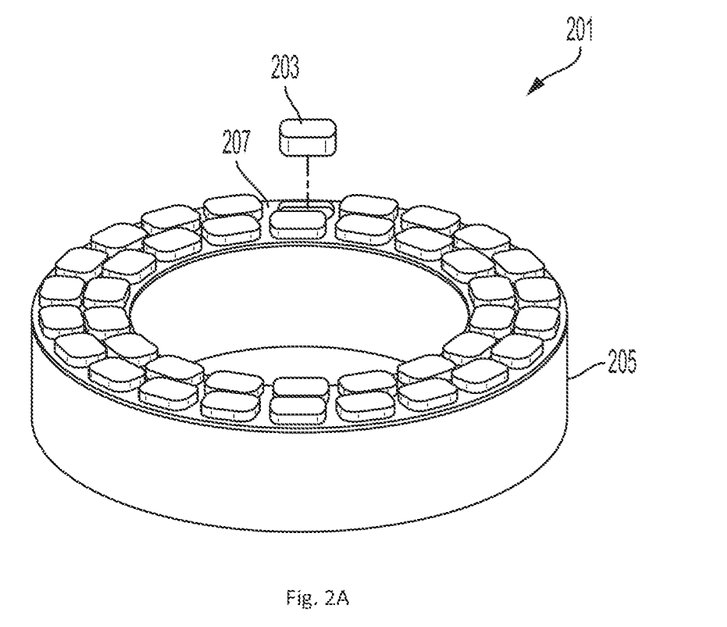
FIG. 2A shows a perspective view of a partially assembled substrate assembly for a thrust bearing assembly according to the present subject matter.

Turning to FIG. 2A, shown is a partially assembled substrate assembly 201 for a thrust bearing assembly in which one of the plurality of thrust bearing elements 203 is not attached to the substrate 205. As shown, the substrate assembly 201 includes two rows of concentrically placed bearing elements 203. The bearing elements are oblong shaped and placed in a manner to control fluid flow therebetween when in operation.

Figure 2B:
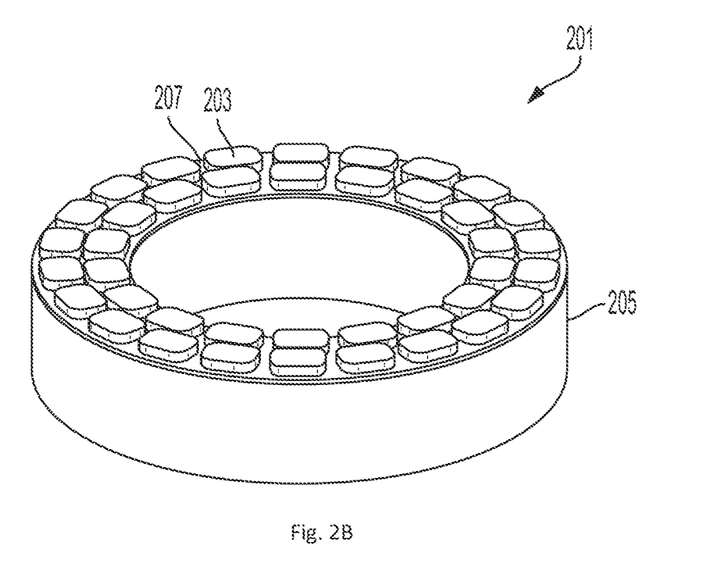
FIG. 2B is a perspective view of the assembled substrate assembly shown in FIG. 2A.

FIG. 2B is a representation of the substrate assembly 201 shown in FIG. 2A in which all of the bearing elements 203 have been joined to the substrate 205 at a substrate surface 207. The substrate bearing elements 303 shown are a trapezoidal in shape. However, any one or more shape may be selected based on desired properties.

Figure 3A:
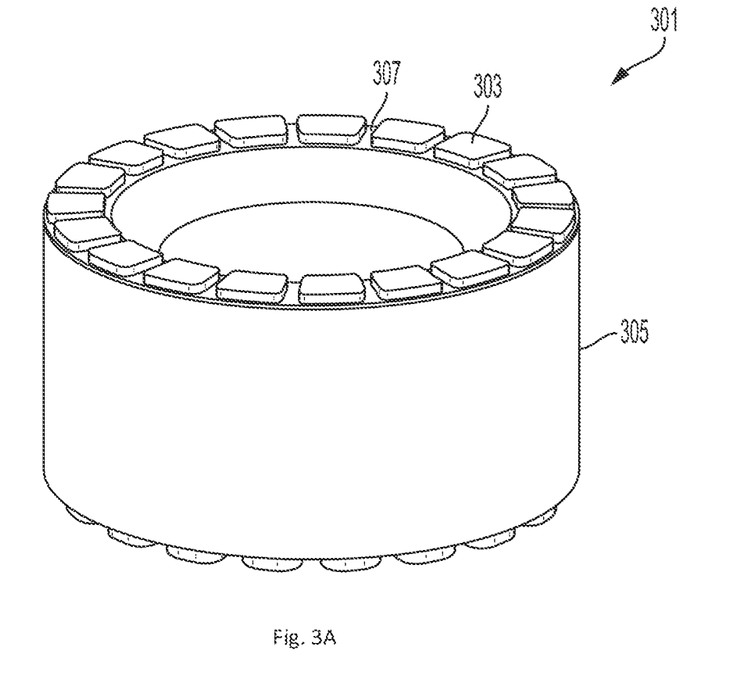
FIG. 3A shows a perspective view of a partially assembled substrate assembly for a thrust bearing assembly according to the present subject matter.
Figure 3B:
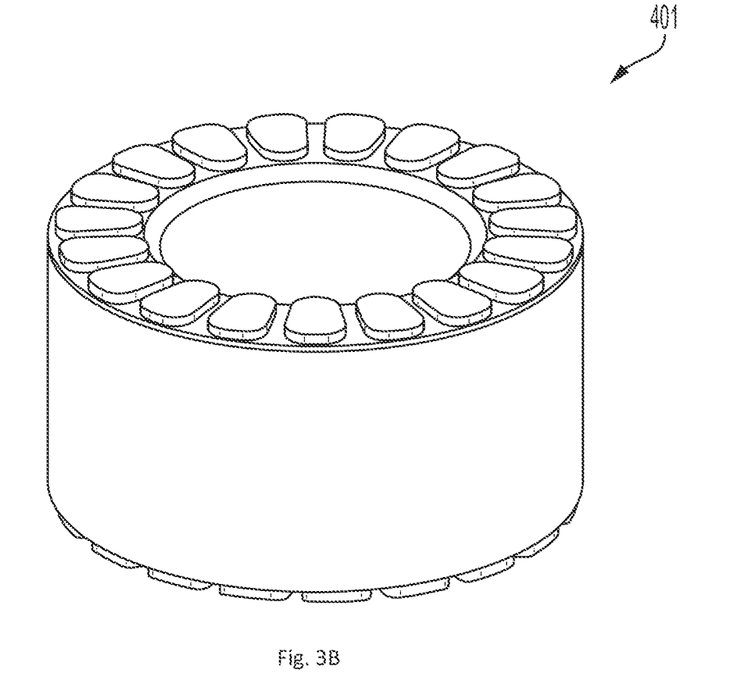
FIG. 3B is a perspective view of the assembled substrate assembly shown in FIG. 3A.

FIG. 3B shows another substrate assembly according to the present subject matter.

Figure 4A:
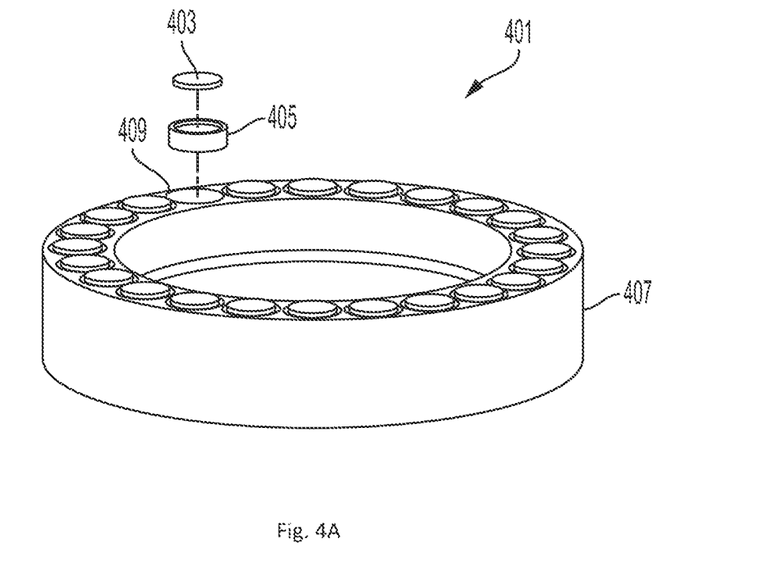
FIG. 4A shows a perspective view of a partially assembled substrate assembly for a thrust bearing assembly according to the present subject matter.

As shown in FIG. 4A, a substrate assembly 401 for a thrust bearing may include one or more bearing elements 403, an intermediate substrate 405 and a substrate 407. As discussed herein above, when an intermediate substrate 405 is employed, it may be the same or different material as the bearing element 403 and the substrate 405. For example, the substrate 407 may comprise a steel material, the intermediate substrate 405 may comprise a cemented carbide material, and the bearing element may comprise a thermally stable material. The intermediate substrate 405 extends the life the bearing assembly by reducing any secondary erosion of the substrate due to material wash. As shown, the intermediate substrate is a carbide receptacle in the shape of a cup. However, the intermediate substrate 405 can be any shape suitable to join the bearing element 403 with the substrate 407.

Figure 4B:
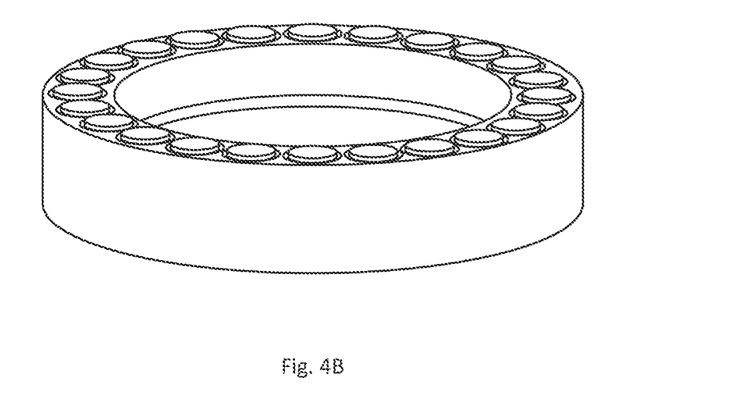
FIG. 4B is a perspective view of the assembled substrate assembly shown in FIG. 4A.

FIG. 4B shows of the substrate assembly 401 shown in FIG. 4A in which all of the bearing elements 403 have been joined to the substrate 405 via the intermediate structures 405 at the substrate surface 409.

Figure 5A:
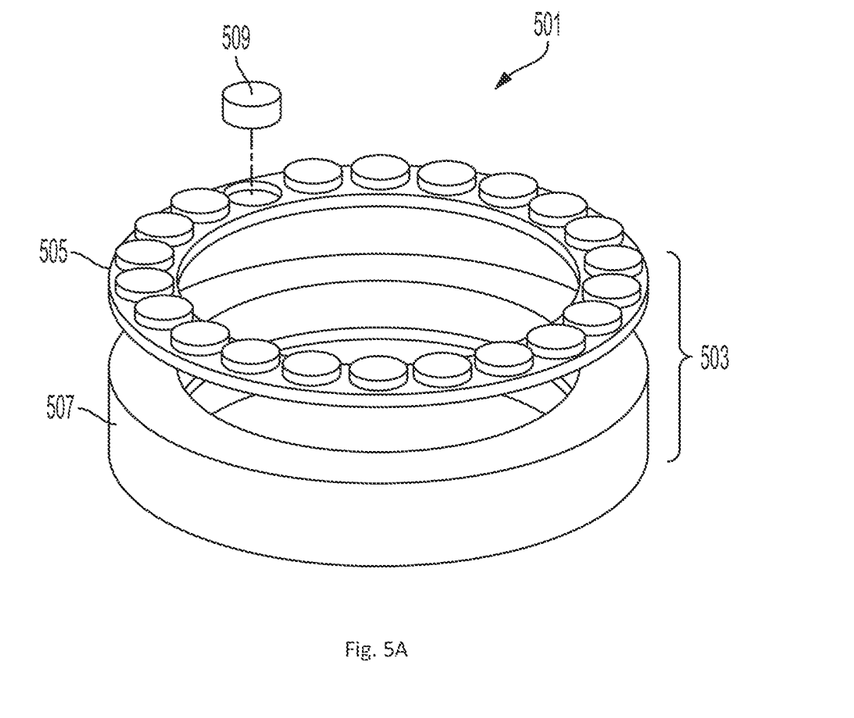
FIG. 5A shows a perspective view of a partially assembled substrate assembly for a thrust bearing assembly according to the present subject matter.

FIG. 5A shows another substrate assembly 501 for a thrust bearing. The substrate 503 comprises a first substrate body, i.e., a surface substrate 505 and a second substrate body, i.e., a base substrate 507. The surface substrate and base substrate can both be formed from any material that is suitable for the present substrates. They may be formed from the same or different materials. For example, the base substrate 507 may comprise steel and the surface substrate 505 may comprise a cemented carbide. Generally, the surface substrate is formed from an erosion resistant material. Bearing elements 509 may be joined to the surface substrate 505 directly or via an intermediate substrate. The surface substrate may be joined to the base substrate by any known method, including brazing, epoxy or other adhesive formulation. Another surface substrate 505 may be provided on the opposing surface of the base substrate with or without additional bearing elements 509 attached thereto.

Figure 5B:
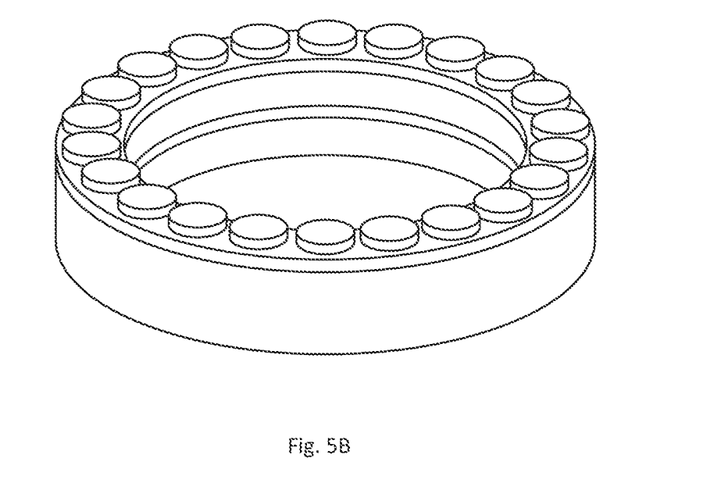
FIG. 5B is a perspective view of the assembled substrate assembly shown in FIG. 5A.

FIG. 5B shows the substrate assembly 501 of FIG. 5A fully assembled.

Figure 6A:
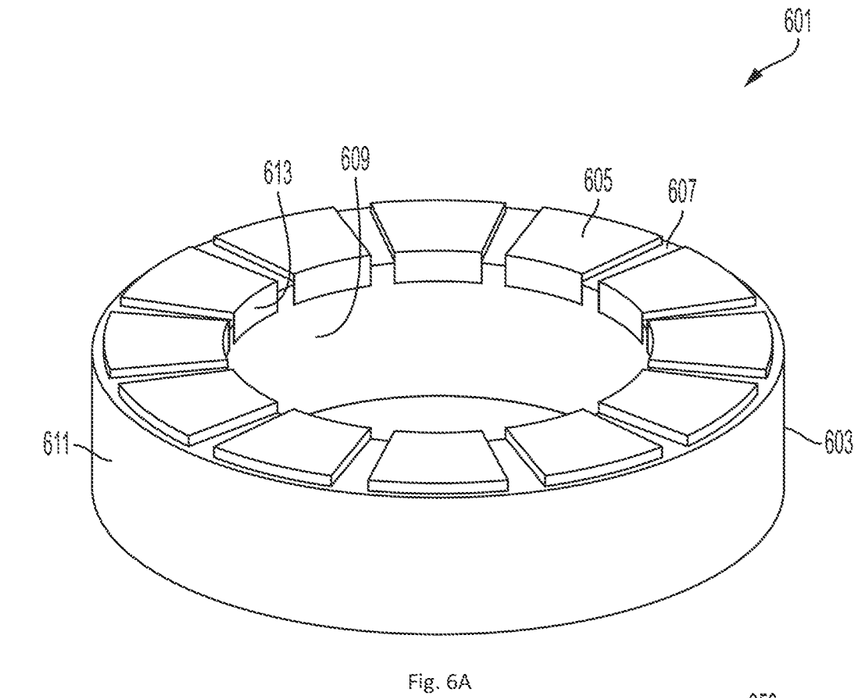
FIG. 6A shows a perspective view of a substrate assembly for a radial bearing assembly according to the present subject matter.

FIG. 6A shows a first, outer substrate 601 for a radial bearing assembly according to the present subject matter. As shown, a substrate 603 is provided with a plurality of bearing elements 605 joined proximate an upper surface 607 thereof. The substrate includes inner diameter surface 609 and outer diameter surface 611. The bearing elements 605 include inner bearing contact surfaces 613, which are configured to be in sliding communication with opposing bearing elements (not shown).

Figure 6B:
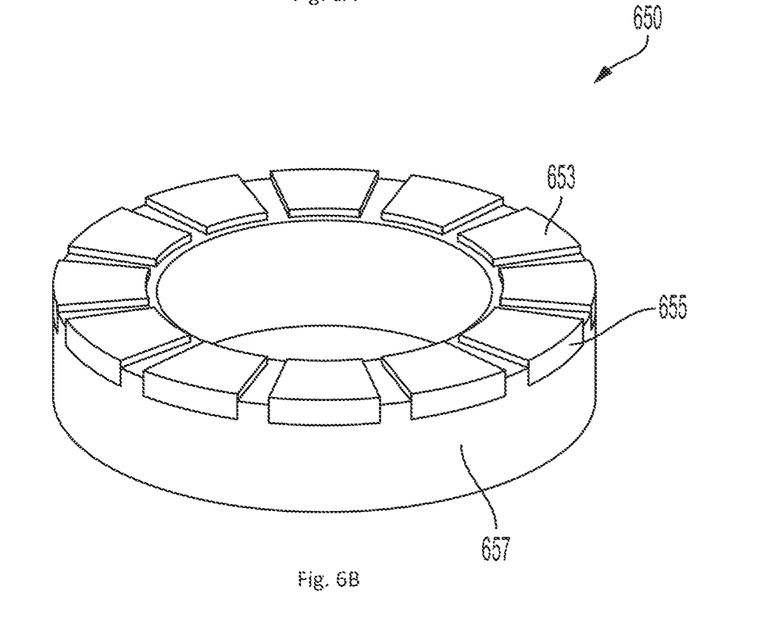
FIG. 6B is a perspective view of an opposing substrate assembly for a radial bearing assembly, which may be used with the substrate assembly of FIG. 6A.

FIG. 6B shows an opposing second, inner substrate assembly 650 which may be placed concentrically inside the first substrate shown in FIG. 6B. The inner substrate 650 includes a plurality of bearing elements 653 including outer diameter surfaces 655 that are may be configured to be in sliding contact with the outer diameter surface 611 shown in FIG. 6A. The bearing elements 655 are joined to the inner substrate 657 by any suitable method to form the inner substrate assembly 650.

In order to achieve preferred bearing assemblies according to the present subject matter, a pneumatic press is utilized to simultaneously seat the bearings into a substrate with an epoxy within 0.0025 cm of the same plane. This allows for the highest proficiency to achieve a solid and uniform hold while simultaneously seating bearings within 0.0025 cm of the same plane, which is preferred to achieve proper bearing load distribution.

Figure 7:
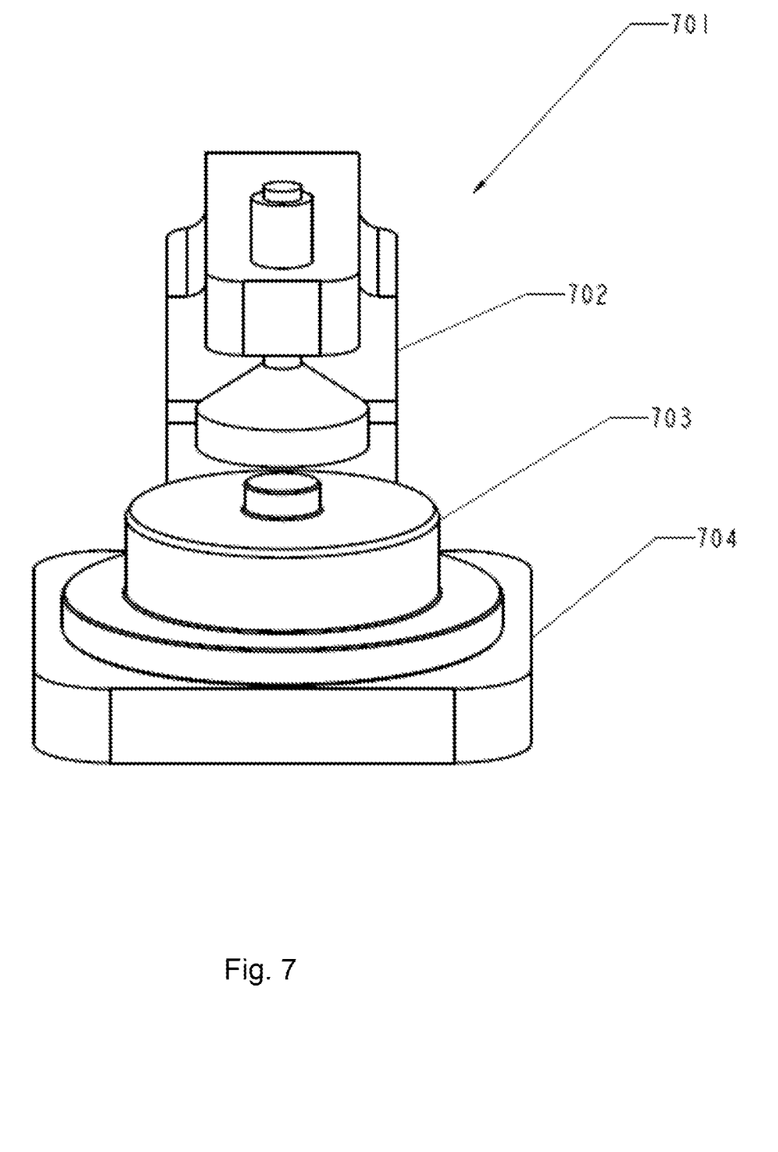
FIG. 7 is a perspective view of a pneumatic press that may be utilized to firmly and evenly press the bearings into place on a substrate after an epoxy is used to adhere the bearings to the substrate.

An example of a pneumatic press that can be utilized is shown in FIG. 7. Shown is a pneumatic arbor press 701 prepared for specialty alignment tooling. The press shown includes a pneumatic press arbor 702, a bottom alignment plate 703, and a pneumatic press stage 704.

Figure 8:
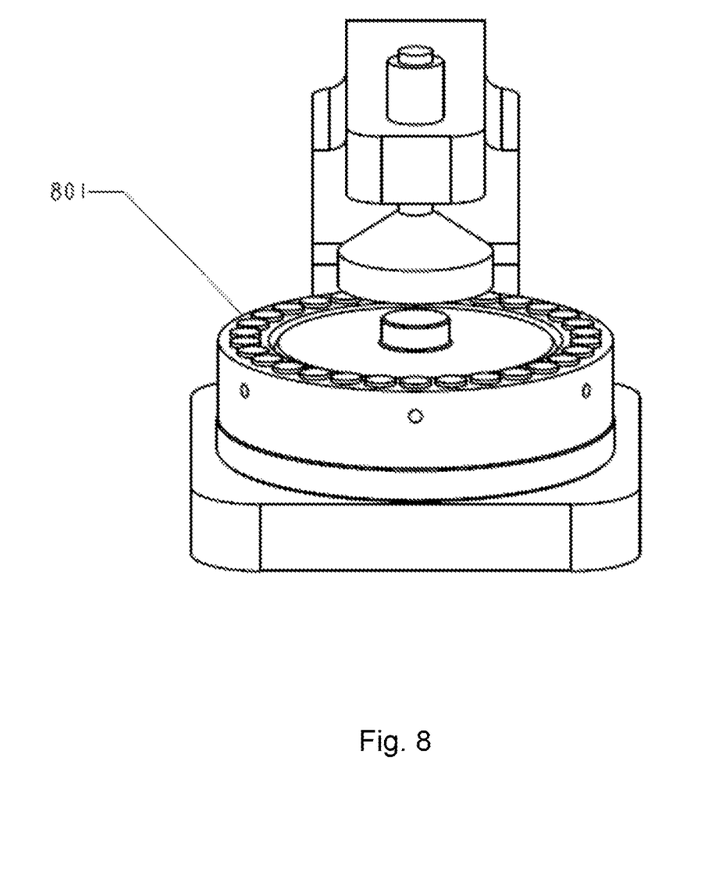
FIG. 8 is a perspective view of the pneumatic press of FIG. 8 with an unfinished bearing assembly in place for pressing.

FIG. 8 shows the pneumatic press of FIG. 7 with a substrate assembly 801 having just applied the epoxy to adhere the bearing elements to the substrate. Not visible in FIG. 8 is a thin sheet of separator material, e.g. non-stick paper, which is placed on top of the substrate assembly to prevent the excess epoxy from sticking or otherwise adhering to a top alignment plate.

Figure 9:
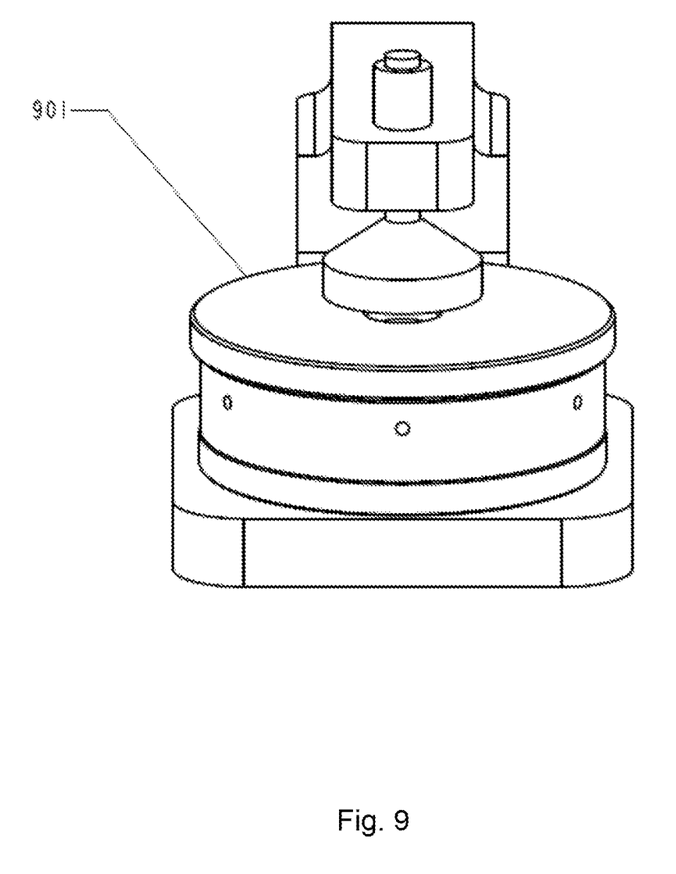
FIG. 9 is a perspective view of the pneumatic press of FIG. 9 with an alignment plate set on top of the bearing assembly prior to pressing.

FIG. 9 shows the pneumatic press of FIG. 8 with the top alignment plate 901 in place for pressing. As noted above a sheet of separator material may be placed between the bearing assembly and the top alignment plate to prevent the excess epoxy from adhering to the top alignment plate.

Thus, provided is a method to manufacture a substrate assembly utilizing a pneumatic press that a solid and uniform hold while simultaneously seating inserts within 0.0025 cm coplanarity. This is a preferred geometry necessary to achieve proper bearing load distribution and functionality.

According to the method, an amount of epoxy is placed in each of the recesses in a substrate. Bearing elements are then placed into the epoxy loaded recesses with little to no force to achieve a wet substrate assembly. As used herein the phrases "wet bearing assembly" or "wet substrate assembly" means a substrate assembly in which the epoxy adhering the bearing elements to the substrate has not yet dried.

The pneumatic press is prepared by first adding a bottom alignment plate to pneumatic press stage, which may be self-centering. The wet substrate assembly is stacked on top of the bottom alignment plate. A special stick resistant separator material, e.g., a sheet of plastic, wax paper, or other non-stick material, is placed on top of the wet substrate assembly to prevent epoxy from adhering to the steel tooling components of the pneumatic press. On top of the separator material, a top alignment plate is placed. The pneumatic press can then be set at a pressure of from 0.2 Megapascal (MPa) to 0.8 MPa. A preferred pressure range is between 0.4 MPa and 0.6 MPa psi. For example, the pneumatic press can be set to a pressure of 70-psi 0.5 MPa.

If the pneumatic press pressure is below 30 psi during bearing seating, multi-plane bearing elements are met with poor parallelism (+0.05 cm out). This also leads to undesirable epoxy thickness compromising holding capabilities leading to bearing failure. Alternatively, when a pressure of greeter than 0.8 MPa is utilized, adverse effects are seen. For example the bearing elements may be chipped or cracked and too much epoxy may be forced out of the recesses in which the bearing elements sit, which leaves behind to thin a layer of epoxy to provide, which leads to bearing assembly failure in use.

Once staged, the pneumatic press is engaged for about 10 seconds, i.e., from 0-10, from 5-15 or from 8-12 seconds, prior to release. This time period ensures all inserts have seated under the same load to achieve the requisite coplanarity. Once released the entire tooling stack is removed from the pneumatic press and set aside for around 24 hours to ensure proper curing.

EXAMPLE

An Instron® push out test was conducted to test the ability to join bearing elements formed from a diamond composite material and stainless steel with epoxy or adhesive compositions. For the test, 9 mm×3 mm VERSIMAX® rounds were encapsulated 1 mm deep into 17-4 PH stainless steel holders that include an aperture to push the thermally stable rounds through. Three different adhesive compositions were used to create two assemblies with each adhesive composition. One of each pair of assemblies was subjected to a high temperature box furnace cycle (500° C. for 30 minutes) to recreate temperatures reflective of those encountered in the field. Once prepared the assemblies were subjected to pressure from a push out tool, i.e., a 0.48 cm steel tip, making contact in the center of the VERSIMAX® round through the aperture in the steel holder. The data collected is presented in table 1 below:

TABLE 1

| Sample ft | Holding Material | Taper | Push Out Test - lbf | State |
|---|---|---|---|---|
| 1 | 620 Loctite 4KM32 | 0.0010 | 121.3 | NO heat |
| 2 | JB Weld 453u38 | 0.0012 | 60.8 | NO heat |
| 3 | 620 Loctite 4KM32 | 0.0009 | 0.00 | 500 C.-30 min |
| 4 | JB Weld 453u38 | 0.0015 | 26.1 | 500 C.-30 min |
| 5 | Omega OB-700 | 0.0020 | 93.7 | NO heat |
| 6 | JB Weld 453u38 | 0.0006 | 78.6 | No heat |
| 7 | Omega OB-700 | 0.0014 | 82.3 | 500 C.-30 min |
| 8 | JB Weld 453u38 | 0.0010 | 113.8 | 500 C.-30 min |

As shown from the push-out test results, all of the adhesive formulations were suitable for joining the VERSIMAX® round to stainless steel at room temperature. However, when subjected to heat, the LOCTITE® formulation was not sufficient to maintain adhesion between the VERSIMAX® round and the steel holder. It is understood that the LOCTITE® formulation was not sufficient because it is a glue rather than an epoxy as described herein.

Although the present subject matter has been described in connection with embodiments thereof, it will be appreciated by those skilled in the art that additions, deletions, modifications, and substitutions not specifically described may be made without departure from the spirit and scope of the subject matter as defined in the appended claims. For example, although described in relation to bearing assemblies, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedeol components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

Further, throughout the application, descriptions of various embodiments use "comprising" language; however, it will be understood by one of skill in the art, that in some instances, an embodiment can alternatively be described using the language "consisting essentially of" or "consisting of."

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A method of manufacturing a bearing assembly comprising at least one substrate assembly, the method comprising:
   providing a substrate having one or more recesses;
   applying a composition comprising an epoxy into each of the recesses;
   inserting at least one bearing element comprising a ceramic-bonded diamond composite into each of the recesses to obtain a wet substrate assembly;
   placing a bottom alignment plate into a pneumatic press;
   stacking the wet substrate assembly onto the bottom alignment plate;
   optionally placing a separator material on top of the wet substrate assembly;
   placing a top alignment plate on top of the wet substrate assembly with or without the separator material therebetween;
   pressing the wet substrate assembly with the pneumatic press at a pressure of from 0.2 to 0.8 psi Megapascal (MPa) for a period of from 5 to 15 seconds;
   removing the pressed wet substrate assembly; and
   curing the wet substrate assembly for 24 hours to obtain the at least one substrate assembly.

2. The method according to claim 1, wherein the substrate comprises an annular ring shape.

3. The method according to claim 1, wherein the substrate is formed from steel.

4. The method according to claim 1, wherein the substrate is formed from a cemented carbide.

5. The method according to claim 1, wherein the ceramic-bonded diamond composite comprises by weight 90% diamond grains, 9% silicon carbide bonded to the diamond grains, and 1% unreacted silicon metal.

6. The method according to claim 1, wherein the ceramic-bonded diamond composite comprises by weight 50-99% diamond grains, 1-25% silicon carbide bonded to the diamond grains, and 0.01-5% unreacted silicon metal.

7. The method according to claim 1, wherein an adhesive formulation comprises silicic acid, steel fines, and an epoxy resin.

8. The method according to claim 1, wherein the at least one bearing element comprises a bearing face formed in a shape selected from the group consisting of a circle, a square, a rectangle, a triangle, a trapezoid, a nonagon, an octagon, a heptagon, a hexagon, a scalene triangle, a right triangle, a parallelogram, a rhombus, a square, a pentagon, a circle, an oval, a star, and a crescent.

9. The method according to claim 1, wherein the at least one bearing element comprises a fluid restriction element.

10. The method according to claim 1, wherein the substrate comprises a fluid restriction element.

11. The method according to claim 1, wherein the substrate comprises a first substrate body and a second substrate body joined together.

12. The method according to claim 11, wherein the first substrate body and the second substrate are different materials.

13. The method according to claim 11, wherein the first substrate body is formed from tungsten carbide and the second substrate body is formed from steel.

* * * * *